United States Patent

Schulze-Icking-Konert

(10) Patent No.: US 9,981,531 B2
(45) Date of Patent: May 29, 2018

(54) DRIVE DEVICE AND METHOD FOR OPERATING A DRIVE DEVICE

(71) Applicant: Robert Bosch GmbH, Stuttgart (DE)

(72) Inventor: Georg Schulze-Icking-Konert, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/196,147

(22) Filed: Jun. 29, 2016

(65) Prior Publication Data

US 2017/0005598 A1  Jan. 5, 2017

(30) Foreign Application Priority Data

Jun. 30, 2015 (DE) .................. 10 2015 212 172

(51) Int. Cl.
| | |
|---|---|
| *H02P 1/54* | (2006.01) |
| *H02K 29/06* | (2006.01) |
| *B60H 1/32* | (2006.01) |
| *F01P 5/04* | (2006.01) |
| *F01P 5/12* | (2006.01) |
| *H02P 5/74* | (2006.01) |
| *H02P 29/02* | (2016.01) |

(52) U.S. Cl.
CPC .............. *B60H 1/3222* (2013.01); *F01P 5/04* (2013.01); *F01P 5/12* (2013.01); *H02P 5/74* (2013.01); *B60H 1/3205* (2013.01); *B60H 2001/3272* (2013.01); *F01P 2037/00* (2013.01); *H02P 29/02* (2013.01)

(58) Field of Classification Search
None
See application file for complete search history.

(56) References Cited

U.S. PATENT DOCUMENTS

| | | | |
|---|---|---|---|
| 2008/0265828 A1* | 10/2008 | Ganev | ............... H02P 25/22 318/777 |
| 2015/0084561 A1* | 3/2015 | Benson | ............... H02P 29/02 318/400.23 |

* cited by examiner

*Primary Examiner* — Bentsu Ro
*Assistant Examiner* — Zemenay Truneh
(74) *Attorney, Agent, or Firm* — Michael Best & Friedrich LLP

(57) ABSTRACT

A drive device comprising at least one control unit (10) for operating a first drive unit (16) with a first operating frequency ($f_{b1}$) from a first operating frequency interval and a second drive unit (18) with a second operating frequency ($f_{b2}$) from a second operating frequency interval, which at least partly overlaps the first operating frequency interval. The control unit (10), in at least one operating state, operates the drive units at least occasionally simultaneously with different operating frequencies ($f_{b1}$, $f_{b2}$) and varies the first operating frequency ($f_{b1}$) and/or the second operating frequency ($f_{b2}$) within the respective operating frequency interval.

11 Claims, 1 Drawing Sheet

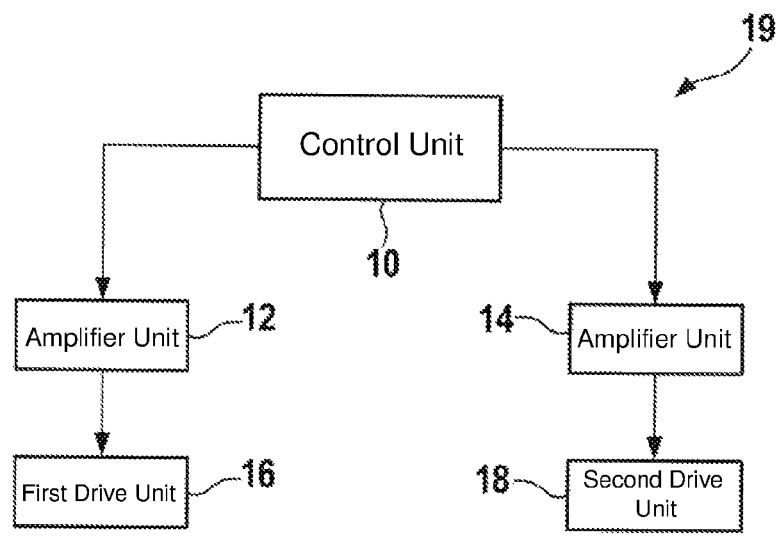
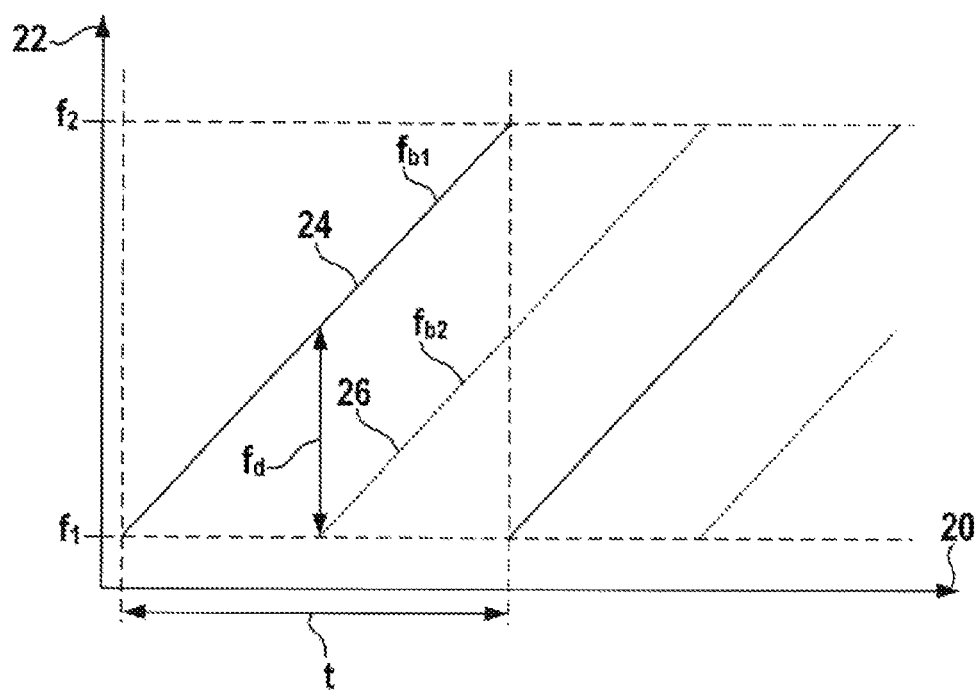

DRIVE DEVICE AND METHOD FOR OPERATING A DRIVE DEVICE

BACKGROUND OF THE INVENTION

The invention proceeds from a drive device and from a method for operating a drive device.

There is already known a drive device comprising at least two drive units and a control unit provided for operating the drive units in each case with a different and fixed operating frequency from an operating frequency interval.

SUMMARY OF THE INVENTION

The invention proceeds from a drive device comprising at least one control unit which is provided for operating a first drive unit with a first operating frequency from a first operating frequency interval and a second drive unit with a second operating frequency from a second operating frequency interval, which at least partly overlaps the first operating frequency interval.

It is proposed that the control unit is provided, in at least one operating state, for operating the first drive unit and the second drive unit at least occasionally simultaneously with different operating frequencies and, in particular for reducing EMC interference fields and/or an average EMC emission, in particular EMC power emission, for varying the first operating frequency and/or the second operating frequency in the process, in particular in defined and/or definable, advantageously equidistant, time steps, within the respective operating frequency interval, in particular between a minimum frequency and a maximum frequency of the respective operating frequency interval. "Provided" should be understood to mean, in particular, specifically programmed, designed and/or equipped. The fact that an object is provided for a specific function should be understood to mean, in particular, that the object fulfills and/or performs said specific function in at least one application and/or operating state. In this case, the term "EMC" stands for the electromagnetic compatibility of technical apparatuses. Furthermore, a "drive device" should be understood to mean, in particular, at least one part, in particular a subassembly, of a drive system and advantageously motor vehicle drive system, in particular for driving a cooling fan, an air-conditioning apparatus and/or a fluid pump, such as a coolant pump, for example. In particular, the drive device may also comprise the entire drive system and advantageously the entire motor vehicle drive system. Furthermore, the drive device may comprise in particular at least the first drive unit and/or the second drive unit. Moreover, it is conceivable for the drive device to comprise further drive units, such as, for example, at least three, at least four and/or at least five drive units, wherein the control unit may be provided in particular for operating all of the drive units at least occasionally simultaneously with different operating frequencies and, in particular for reducing EMC interference fields and/or an average EMC emission, in particular EMC power emission, for varying the respective operating frequency within a respective operating frequency interval in the process.

Furthermore, a "drive unit" should be understood to mean, in particular, a unit which is advantageously clocked, operated in a clocked fashion and/or operable in a clocked fashion and which is provided, in particular, for driving at least one object, advantageously at least one mechanical unit, by means of an energy conversion and/or for advantageously transmitting at least one force, particularly preferably a torque, to the object. In this case, the drive unit may be embodied as an arbitrary drive unit that appears to be expedient to a person skilled in the art, in particular drive unit operated with AC current, drive unit operated with AC voltage, drive unit operated with DC current and/or drive unit operated with DC voltage, advantageously as a motor, particularly preferably as an, in particular, brushed and/or brushless, electric motor. The drive unit is preferably arranged in a motor vehicle and particularly preferably part of a cooling fan, of an air-conditioning apparatus and/or of a fluid pump, such as a coolant pump, for example. Advantageously, the operating frequency at least substantially corresponds to a drive frequency, advantageously of a PWM control signal, in particular of the control unit. The fact that "the operating frequency at least substantially [corresponds] to a drive frequency" should be understood to mean, in particular, that the operating frequency deviates from the drive frequency by at most 10%, advantageously by at most 5%, and particularly preferably by at most 2%. In this case, a lower limit and/or a minimum frequency of the operating frequency interval is advantageously defined and/or predetermined at least by a threshold of audibility and is in particular at least 15 kHz and particularly preferably at least 16 kHz. Furthermore, an upper limit and/or a maximum frequency of the operating frequency interval is preferably defined and/or predetermined at least by a, in particular predetermined and/or predeterminable, switching loss limit value and/or power loss limit value, in particular of the drive unit, and is in particular a maximum of 30 kHz and particularly preferably a maximum of 20 kHz. In this case, an overlap region of the operating frequency intervals, in particular at least of the first operating frequency interval and of the second operating frequency interval, is advantageously at least 0.1 kHz, preferably at least 0.5 kHz and particularly preferably at least 1 kHz.

Furthermore, a "control unit" should be understood to mean, in particular, an electrical and/or electronic unit comprising at least one control electronics system. A "control electronics system" should be understood to mean, in particular, a unit comprising a computing unit and comprising a storage unit and also comprising an operating, control and/or regulating program stored in the storage unit, said program being provided in particular for being executed by the computing unit. In particular, the control unit could in this case comprise a plurality of—in particular embodied separately from one another—control apparatuses and/or controllers, in particular microcontrollers, in particular at least two, at least three, at least four and/or at least five control apparatuses and/or controllers, in particular microcontrollers, which advantageously communicate via at least one, preferably separate, signal line and/or a communication bus and are provided in particular in each case for operating exactly one of the drive units. Advantageously, however, the control unit has exactly one control apparatus and/or exactly one controller, in particular microcontroller, which is provided in particular for operating the drive units, in particular at least the first drive unit and the second drive unit. Advantageously, the control unit is furthermore provided for regularly and/or periodically synchronizing operation of the drive units, in particular at least of the first drive unit and of the second drive unit. This configuration makes it possible to provide a drive device having improved properties with regard to efficiency, in particular emission efficiency, in particular EMC emission efficiency, and/or cost-effectiveness. In this case, in particular, a superimposition and/or addition of EMC interference fields and/or a peak EMC emission can be avoided, advantageously with simultaneous reduction of an average EMC emission, as a result of which, in particular, legal limit values can be complied with. Moreover, structural changes and/or new cablings, in particular for reducing the EMC emission, can advantageously be dispensed with, as a result of which advantageously costs can be lowered and production can be improved.

Preferably, the control unit is provided, in the operating state, for varying the first operating frequency and/or the second operating frequency within an overlap region of the operating frequency intervals, in particular at least of the first operating frequency interval and of the second operating frequency interval. In particular, advantageous operation can be achieved as a result.

If the control unit is provided, in the operating state, for varying the first operating frequency and/or the second operating frequency monotonically, advantageously strictly monotonically, particularly preferably linearly, in particular in a rising and/or falling fashion, over at least three frequency steps and advantageously over an entire respective operating frequency interval, in particular a control algorithm can be simplified, as a result of which advantageously operation can be optimized.

A particularly simple driving can be achieved in particular if the control unit is provided, in the operating state, for varying the first operating frequency and/or the second operating frequency in equidistant frequency steps.

In one configuration of the invention it is proposed that the control unit is provided, in the operating state, for varying the first operating frequency and/or the second operating frequency proceeding from a minimum frequency, in particular the minimum frequency already mentioned above, up to a maximum frequency, in particular the maximum frequency already mentioned above, of the respective operating frequency interval and/or proceeding from the maximum frequency down to the minimum frequency of the respective operating frequency interval. In particular, a particularly effective reduction of EMC interference fields and/or of an average EMC emission can be achieved as a result.

In one particularly preferred configuration of the invention it is proposed that the control unit is provided, in the operating state, for periodically continuing a driving and/or the operation of the first drive unit and/or of the second drive unit. In this context, the expression "periodically continuing" should be understood to mean, in particular, that a drive signal of the control unit has a periodicity and/or corresponds to a periodic function and/or the control unit is provided in particular for periodically varying the drive signal and/or the operating frequencies. Advantageously, in this case, the control unit is provided for operating the drive units, in particular at least the first drive unit and/or the second drive unit, in such a way that the first operating frequency and/or the second operating frequency vary/varies periodically, in particular proceeding from the minimum frequency up to the maximum frequency and/or proceeding from the maximum frequency down to the minimum frequency. In particular, a control can be simplified and/or a power efficiency can be improved as a result.

Furthermore, it is proposed that the control unit is provided, in the operating state, for operating the first drive unit and the second drive unit simultaneously with different operating frequencies at each point in time and/or permanently. In particular, uniform operation of the drive units can be achieved as a result.

In one preferred configuration of the invention it is proposed that the first operating frequency interval is identical to the second operating frequency interval. As a result, in particular, a power efficiency can be improved further, an average EMC emission can be reduced further and/or switching losses can be effectively minimized.

Particularly preferably, the control unit is provided, during simultaneous operation, in particular in the operating state, of the first drive unit and the second drive unit, for keeping a frequency spacing between the first operating frequency and the second operating frequency at least substantially constant. In this context, the expression "at least substantially constant" should be understood to mean, in particular, that the frequency spacing between the operating frequencies fluctuates by at most 10%, preferably at most 5% and particularly preferably at most 2%. In particular, a control algorithm can be simplified further as a result.

If the control unit is provided, during simultaneous operation, in particular in the operating state, of the first drive unit and the second drive unit, for maximizing a frequency spacing between the first operating frequency and the second operating frequency, in particular an average EMC emission can be reduced and/or a superimposition of a peak EMC emission can advantageously be avoided.

In addition, the invention proceeds from a method for operating a drive device, wherein a first drive unit is operated with a first operating frequency from a first operating frequency interval and a second drive unit is operated with a second operating frequency from a second operating frequency interval, which at least partly overlaps the first operating frequency interval.

It is proposed that, in at least one operating state, the first drive unit and the second drive unit are operated at least occasionally simultaneously with different operating frequencies and, in particular for reducing EMC interference fields and/or an average EMC emission, in particular EMC power emission, the first operating frequency and/or the second operating frequency are/is varied in the process, in particular in defined and/or definable, advantageously equidistant, time steps, within the respective operating frequency interval, in particular between a minimum frequency and a maximum frequency of the respective operating frequency interval. As a result, in particular, an efficiency, in particular an emission efficiency, in particular EMC emission efficiency, and/or a cost-effectiveness can be improved and, in particular, a superimposition of EMC interference fields and/or a peak EMC emission can be avoided with simultaneous reduction of an average EMC emission.

In this case, the drive device shall not be restricted to the application and embodiment described above. In particular, for fulfilling a functioning described herein, the drive device may have a number of individual elements, components and units that deviates from a number mentioned herein.

BRIEF DESCRIPTION OF THE DRAWINGS

Further advantages will become apparent from the following description of the drawings. The drawings illustrate an exemplary embodiment of the invention. The drawings, the description and the claims contain numerous features in combination. The person skilled in the art will expediently also consider the features individually and combine them to form expedient further combinations.

In the figures:

FIG. 1 shows a drive system comprising a drive device in a schematic illustration, and FIG. 2 shows operating signals of a first drive unit and of a second drive unit of the drive device.

DETAILED DESCRIPTION

FIG. 1 shows an exemplary drive system 19 embodied as a motor vehicle drive system in a schematic illustration. In the present case, the drive system 19 is provided for driving a cooling fan. Alternatively, however, a drive system may also be embodied as any other drive system appearing to be expedient to a person skilled in the art, advantageously motor vehicle drive system, such as, for example, as a drive system for drive for an air-conditioning apparatus and/or a fluid pump. The drive system comprises a drive device.

The drive device comprises a first drive unit 16. The first drive unit 16 is operable in a clocked fashion, in particular for setting and/or changing a rotational speed. The first drive unit 16 is embodied as a DC motor. The first drive unit 16 is embodied as an electric motor. The first drive unit 16 is embodied as an electric motor with the capability of permanent magnet excitation. In the present case, the first drive unit 16 is embodied as a brushed electric motor. In the present case, the first drive unit 16 is embodied as a cooling fan motor. Furthermore, the drive device comprises a second drive unit 18. The second drive unit 18 is embodied at least substantially identically, in particular identically apart from production tolerances and/or within the scope of production engineering possibilities, to the first drive unit 16. Alternatively, it is conceivable for a first drive unit and/or a second drive unit to be embodied as any other drive unit appearing to be expedient to a person skilled in the art, such as, for example, as a brushless electric motor. Moreover, a first drive unit and a second drive unit could be embodied at least partly differently from one another. It is also conceivable for a drive device to comprise further drive units, in particular embodied at least substantially identically to or differently from the first drive unit and/or the second drive unit, in particular at least three, at least four, at least five and/or at least six drive units.

In the present case, the first drive unit 16 and the second drive unit 18 are embodied such that they are operated by a current. In order to provide an operating current required for this purpose, the drive device comprises at least one amplifier unit 12, 14. In the present case, the drive device comprises two amplifier units 12, 14. The amplifier units 12, 14 are connected to the drive units 16, 18, in the present case in particular by means of an electrical connection. The amplifier units 12, 14 are embodied at least substantially identically to one another, in particular identically to one another apart from production tolerances and/or within the scope of production engineering possibilities. In the present case, the amplifier units 12, 14 are embodied as output stages, in particular motor output stages. It is alternatively conceivable to dispense with at least one amplifying unit and/or to provide further amplifier units. Moreover, amplifier units could be embodied at least partly differently from one another. In addition, it is conceivable for a drive device to comprise further units, such as, for example, filter units and/or converters, in particular analogue-to-digital converters, conversion units and/or transducers.

Furthermore, the drive device comprises a control unit 10. In the present case, the control unit 10 comprises exactly one control apparatus. The control unit 10 is provided for controlling and/or regulating operation of the drive device and/or of the drive system 19. For this purpose, the control unit 10 comprises a computing unit, a storage unit and an operating program stored in the storage unit, said program being provided for being executed by the computing unit. Furthermore, the control unit 10 is provided for operating the first drive unit 16 and the second drive unit 18. In the present case, the control unit 10 is provided for controlling and/or regulating operation of the drive units 16, 18 by means of a driving of the amplifier units 12, 14. In this case, a control signal of the control unit 10 corresponds to a PWM control signal. Moreover, the control unit 10 has for this purpose a connection, in the present case in particular an electrical connection, to the amplifier units 12, 14. It is alternatively also conceivable, however, for a drive device to be free of amplifier units and/or for a control unit to be provided, in particular for the purpose of operation of the drive units, for directly driving the drive units. In addition, a control unit could have a connection to at least one amplifier unit and/or at least one drive unit that deviates from an electrical connection, such as, for example, a wireless connection, in particular a radio connection. It is also conceivable that a control unit could comprise a plurality of control apparatuses and/or controllers.

The control unit 10 is provided for operating the first drive unit 16 with a first operating frequency. In addition, the control unit 10 is provided for operating the second drive unit 18 with a second operating frequency. In a first operating state, the control unit 10 may be provided in this case for operating only one of the drive units 16, 18. In addition, the control unit 10 may be provided, in a second operating state, for operating the first drive unit 16 and the second drive unit 18 simultaneously with a fixed operating frequency. Moreover, the control unit 10 may be provided, in a third operating state, for operating the first drive unit 16 with a first operating frequency from an operating frequency interval and for operating the second drive unit 18 with a second operating frequency from a further operating frequency interval, wherein the operating frequency interval and the further operating frequency interval are free of overlap.

In the present case, however, the control unit 10 is provided, in at least one operating state, for operating the first drive unit 16 with a first operating frequency $f_{b1}$ from a first operating frequency interval and the second drive unit 18 with a second operating frequency $f_{b2}$ from a second operating frequency interval, which at least partly overlaps the first operating frequency interval, for operating the first drive unit 16 and the second drive unit 18 at least occasionally simultaneously with different operating frequencies $f_{b1}$, $f_{b2}$ in the process, and for varying the first operating frequency $f_{b2}$ and the second operating frequency $f_{b2}$ within the respective operating frequency interval in the process. As a result, EMC interference fields, which always occur in particular during operation of electrical and/or electronic apparatuses, in particular EMC interference fields of the drive units 16, 18 and/or of the amplifier units 12, 14, can be reduced. In particular, a superimposition and/or an addition of a peak EMC emission can be avoided on account of the operation of the drive units 16, 18 with different operating frequencies $f_{b1}$, $f_{b2}$. Moreover, the variation of the first operating frequency $f_{b1}$ and/or of the second operating frequency $f_{b2}$ makes it possible to reduce an average EMC emission and/or an average EMC power emission, in particular in temporal average value measurements, as a result of which legal limit values can advantageously be complied with.

FIG. 2 then shows such an, in particular exemplary, operating state. Time is represented on an abscissa axis 20. An ordinate axis 22 is established as an axis for a variable, in particular as a frequency axis. A curve 24, in particular a time/operating frequency curve, shows an operating profile, in particular over a period, of the first drive unit 16. The curve 24 shows a temporal profile of the first operating frequency $f_{b1}$. A curve 26, in particular a time/operating frequency curve, shows an operating profile, in particular over a period, of the second drive unit 18. The curve 26 shows a temporal profile of the second operating frequency $f_{b2}$.

In the present case, the control unit 10 is provided, in the operating state, for operating the first drive unit 16 and the second drive unit 18 simultaneously with different operating frequencies $f_{b1}$, $f_{b2}$ at each point in time and/or permanently. In addition, the second operating frequency interval is identical to the first operating frequency interval. A minimum frequency $f_1$ of the operating frequency intervals is 16 kHz in this case. A maximum frequency $f_2$ of the operating frequency intervals is 17.7 kHz.

The control unit 10 is provided, in the operating state, for varying the first operating frequency $f_{b1}$ and the second operating frequency $f_{b2}$ within an overlap region of the operating frequency intervals. In this case, the control unit 10 is provided for varying the first operating frequency $f_{b1}$ and the second operating frequency $f_{b2}$ in equidistant time steps, in particular between 0.1 ms and 100 ms, advantageously between 0.5 ms and 50 ms, and particularly preferably between 1 ms and 10 ms. In the present case, the control unit 10 is provided for varying the first operating frequency $f_{b1}$ and the second operating frequency $f_{b2}$ in equidistant time steps of 2 ms. In addition, the control unit 10 is provided for varying the first operating frequency $f_{b1}$ and the second operating frequency $f_{b2}$ in equidistant frequency steps, in particular between 30 Hz and 160 Hz, advantageously between 40 Hz and 140 Hz, preferably between 50 Hz and 120 Hz, and particularly preferably between 60 Hz and 100 Hz. In the present case, the control unit 10 is provided for varying the first operating frequency $f_{b1}$ and the second operating frequency $f_{b2}$ in equidistant frequency steps of 68 Hz. Furthermore, the control unit 10 is provided for varying the first operating frequency $f_{b1}$ and the second operating frequency $f_{b2}$ monotonically, in particular in a linearly rising fashion, over the entire first operating frequency interval and/or the entire second operating frequency interval. In this case, the control unit 10 is provided for varying the first operating frequency $f_{b1}$ and the second operating frequency $f_{b2}$ proceeding from the minimum frequency $f_1$ up to the maximum frequency $f_2$. Alternatively, it is conceivable for the control unit to be provided for varying a first operating frequency and a second operating frequency in a linearly falling fashion or in a linearly falling and linearly rising fashion over an entire first operating frequency interval and/or an entire second operating frequency interval.

In the present case, the control unit 10 is thus provided for varying the operating frequencies $f_{b1}$, $f_{b2}$ of the drive units 16, 18 in 25 frequency steps every 2 ms between 16 kHz and 17.7 kHz. In addition, the control unit 10 is provided, in the operating state, for periodically continuing a driving of the drive units 16, 18. In this case, a period duration t is dependent on a number of frequency steps, in particular between the minimum frequency $f_1$ and the maximum frequency $f_2$, and a number of time steps, in particular between the minimum frequency $f_1$ and the maximum frequency $f_2$, and is in particular 50 ms in the present case. Accordingly, the control unit 10 is provided for varying the operating frequencies $f_{b1}$, $f_{b2}$ of the drive units 16, 18 in 25 frequency steps every 2 ms proceeding from 16 kHz to 17.1 kHz and for varying directly afterward in turn the operating frequencies $f_{b1}$, $f_{b2}$ of the drive units 16, 18 in 25 frequency steps every 2 ms proceeding from 16 kHz to 17.7 kHz. As a result, in particular, an average EMC emission and/or an average EMC power emission, in particular in the case of temporal average value measurements, can be reduced.

Particularly in order to avoid a superimposition and/or an addition of a peak EMC emission, the control unit 10 is furthermore provided for operating the first drive unit 16 and the second drive unit 18 in a manner offset temporally. In the present case, the control unit 10 is provided, during simultaneous operation of the drive units 16, 18, for maximizing a frequency space $f_d$ between the first operating frequency $f_{b1}$ and the second operating frequency $f_{b2}$. In the present case, a maximum frequency spacing $f_d$ thus corresponds to an average frequency of the first operating frequency interval and/or of the second operating frequency interval, in the present case in particular 850 Hz. In addition, the control unit 10 is provided for keeping constant the frequency spacing $f_d$ between the first operating frequency $f_{b1}$ and the second operating frequency $f_{b2}$ in the operating state. For this purpose, the control unit 10 is provided for regularly, in the present case in particular periodically, synchronizing operation of the drive units 16, 18. In the present case, the control unit 10 is provided for synchronizing operation of the drive units 16, 18 every 50 ms.

The values and/or variables presented in the present description are intended in this case merely to describe possible operation of the drive device and/or of the drive system 19 and should thus on no account be judged in a restrictive way.

The invention claimed is:

1. A drive device comprising at least one control unit (10) for operating a first drive unit (16) with a first operating frequency ($f_{b1}$) from a first operating frequency interval and a second drive unit (18) with a second operating frequency ($f_{b2}$) from a second operating frequency interval, which at least partly overlaps the first operating frequency interval, characterized in that the control unit (10), in at least one operating state, operates the first drive unit (16) and the second drive unit (18) at least occasionally simultaneously with different operating frequencies ($f_{b1}$, $f_{b2}$) and varies both the first operating frequency ($f_{b1}$) and the second operating frequency ($f_{b2}$) proceeding from a minimum frequency ($f_1$) up to a maximum frequency ($f_2$) of the respective operating frequency interval and/or proceeding from the maximum frequency ($f_2$) down to the minimum frequency ($f_1$) within the respective operating frequency interval.

2. The drive device according to claim 1, characterized in that the control unit (10), in the operating state, varies both the first operating frequency ($f_{b1}$) and the second operating frequency ($f_{b2}$) within an overlap region of the operating frequency intervals.

3. The drive device according to claim 1, characterized in that the control unit (10), in the operating state, varies both the first operating frequency ($f_{b1}$) and the second operating frequency ($f_{b2}$) monotonically over at least three frequency steps.

4. The drive device according to claim 1, characterized in that the control unit (10), in the operating state, varies both the first operating frequency ($f_{b1}$) and the second operating frequency ($f_{b2}$) in equidistant frequency steps.

5. The method according to claim 4, wherein the equidistant frequency steps are each between 30 Hz and 160 Hz.

6. The drive device according to claim 1, characterized in that the control unit (10), in the operating state, periodically continues a driving of the first drive unit (16) and of the second drive unit (18).

7. The drive device according to claim 1, characterized in that the control unit (10), in the operating state, operates the first drive unit (16) and the second drive unit (18) simultaneously with different operating frequencies ($f_{b1}$, $f_{b2}$) that vary at each point in time.

8. The drive device according to claim 1, characterized in that the first operating frequency interval is identical to the second operating frequency interval.

9. The drive device according to claim 1, characterized in that the control unit (10), during simultaneous operation of the first drive unit (16) and the second drive unit (18), maximizes a frequency spacing ($f_d$) between the first operating frequency ($f_{b1}$) and the second operating frequency ($f_{b2}$).

10. A drive system (19) comprising at least two drive devices according to claim 1, wherein the at least two drive devices include at least two electric motors.

11. A drive device comprising at least one control unit (10) for operating a first drive unit (16) with a first operating frequency ($f_{b1}$) from a first operating frequency interval and a second drive unit (18) with a second operating frequency ($f_{b2}$) from a second operating frequency interval, which at least partly overlaps the first operating frequency interval, characterized in that the control unit (10), in at least one operating state, operates the first drive unit (16) and the second drive unit (18) at least occasionally simultaneously with different operating frequencies ($f_{b1}$, $f_{b2}$) and varies both the first operating frequency ($f_{b1}$) and the second operating frequency ($f_{b2}$) within the respective operating frequency interval, characterized in that the control unit (10), during simultaneous operation of the first drive unit (16) and the second drive unit (18), keeps a frequency spacing ($f_d$) between the first operating frequency ($f_{b1}$) and the second operating frequency ($f_{b2}$) at least substantially constant while the first operating frequency and the second operating frequency both vary during the operating frequency intervals.

* * * * *